United States Patent
Seler et al.

(10) Patent No.: US 10,698,080 B2
(45) Date of Patent: Jun. 30, 2020

(54) AUTOMOTIVE RADAR FOR V2X COMMUNICATION

(71) Applicant: NXP B.V., Eindhoven (NL)

(72) Inventors: Ernst Julien-Nathanael Seler, Munich (DE); Ralf Reuter, Landshut (DE)

(73) Assignee: NXP B.V., Eindhoven (NL)

( * ) Notice: Subject to any disclaimer, the term of this patent is extended or adjusted under 35 U.S.C. 154(b) by 325 days.

(21) Appl. No.: 15/695,189

(22) Filed: Sep. 5, 2017

(65) Prior Publication Data

US 2018/0128898 A1 May 10, 2018

(30) Foreign Application Priority Data

Nov. 9, 2016 (EP) .................................. 16197988

(51) Int. Cl.
| | | |
|---|---|---|
| G01S 7/00 | (2006.01) | |
| G01S 13/931 | (2020.01) | |
| G08C 17/02 | (2006.01) | |
| H04B 7/26 | (2006.01) | |

(52) U.S. Cl.
CPC .............. *G01S 7/006* (2013.01); *G01S 7/003* (2013.01); *G01S 13/931* (2013.01); *G01S 2013/9316* (2020.01); *G08C 17/02* (2013.01); *H04B 7/26* (2013.01)

(58) Field of Classification Search
CPC combination set(s) only.
See application file for complete search history.

(56) References Cited

U.S. PATENT DOCUMENTS

| | | |
|---|---|---|
| 7,492,309 B2 | 2/2009 | Hurst et al. |
| 2002/0003488 A1 | 1/2002 | Levin et al. |
| 2007/0096885 A1 | 5/2007 | Cheng et al. |
| 2009/0323782 A1 | 12/2009 | Baker et al. |
| 2016/0320482 A1* | 11/2016 | Ling ................. G01S 13/931 |
| 2016/0334504 A1* | 11/2016 | Ling ................... G01S 7/006 |
| 2016/0357183 A1* | 12/2016 | Shaw ................. G05D 1/0027 |
| 2017/0223807 A1* | 8/2017 | Recker .............. H05B 37/0272 |
| 2017/0328997 A1* | 11/2017 | Silverstein ............ G01S 7/41 |
| 2017/0339231 A1* | 11/2017 | Lee ..................... H04L 12/12 |
| 2018/0077518 A1* | 3/2018 | Nguyen ............... H04W 84/00 |
| 2018/0088230 A1* | 3/2018 | Hung .................. G01S 13/08 |
| 2018/0128917 A1* | 5/2018 | Bialer ................ G01S 13/931 |
| 2019/0086509 A1* | 3/2019 | Bilik ..................... G01S 7/021 |

* cited by examiner

*Primary Examiner* — Mamadou L Diallo
(74) *Attorney, Agent, or Firm* — Rajeev Madnawat

(57) ABSTRACT

An apparatus comprising a communication element for an automotive radar system, the communication element configured to communicate with a remote device remote from the automotive radar system by one or more of:
 a) providing signalling to the automotive radar system to send information to the remote device;
 b) receiving signalling representative of information from the remote device via the automotive radar system.

15 Claims, 2 Drawing Sheets

AUTOMOTIVE RADAR FOR V2X COMMUNICATION

The present disclosure relates to an apparatus for communicating with a remote device using an automotive radar system.

According to a first aspect of the present disclosure there is provided an apparatus comprising a communication element for an automotive radar system, the communication element configured to communicate with a remote device remote from the automotive radar system by one or more of: a) providing signalling to the automotive radar system to send information to the remote device; b) receiving signalling representative of information from the remote device via the automotive radar system.

In one or more embodiments, information is sent to the remote device by a wireless signal and information is received at the automotive radar system from the remote device as a wireless signal.

In one or more embodiments, the communication element is configured to provide signalling to the automotive radar system based one or more of: a) a received user generated control signal; b) a distance between the automotive radar system and the remote device; and c) a time reaching a predetermined time.

In one or more embodiments, the communication element provides for routing of information received from the remote device to one or more of a plurality of devices.

In one or more embodiments, the routing is based on the information itself or predetermined routing information. Accordingly the communication element enables multiple devices to communicate with one or more remote devices using the automotive radar system.

In one or more embodiments, the communication element provides for routing of information received from the remote device to one or more of a plurality of devices.

In one or more embodiments, the apparatus comprises: a controller for a wirelessly triggered garage door opener: a traffic signal prioritization controller for wirelessly controlling the operation of a traffic light; or a vehicle to vehicle communication unit, for sending information to a remote vehicle.

According to a second aspect of the present disclosure there is provided an automotive radar system, the automotive radar system comprising a transmitting antenna and a receiving antenna wherein the transmitting antenna is configured to transmit information to the remote device based on the signalling from the communication element and wherein the receiving antenna is configured to receive wireless signalling representative of information from the remote device for receipt by the communication element.

In one or more examples, the transmitting antenna and receiving antenna is also used for sending wireless signals and receiving reflections of the wireless signals for the detection and ranging of objects in a space around the automotive radar system.

In one or more examples, the transmitting antenna and the receiving antenna are the same antenna. For example, in one or more embodiments, the automotive radar system comprises a transceiver which provides for the function of both a transmitting antenna and a receiving antenna.

In one or more embodiments, the system includes an encoder and providing signalling to the automotive radar system comprises providing signalling to the encoder configured to encode information into a wireless signal for transmission from the automotive radar system to the remote device via the transmitting antenna.

In one or more embodiments, the system further comprises a decoder configured to decode information from signalling representative of information received from the remote device by the automotive radar system.

In one or more embodiments, the encoder is configured to encode information by one or more of: an analogue modulation technique; a digital modulation technique; or a spread spectrum modulation technique.

In one or more embodiments, the automotive radar system is configured to generate wireless signals in the range of 1-300 GHz.

In one or more examples, the same frequency range is used for providing information to and receiving information from the remote device as is used for detection and/or ranging of objects in a space around the automotive radar system.

In one or more embodiments, the communication and the automotive radar system is configured to provide for operation in a radar mode, wherein a radar signal for detection and ranging is output by the automotive radar system which does not comprise information for receipt by the remote device and one or more of:

a) a signalling mode, wherein the communication element is configured to provide signalling to the automotive radar system to cause the automotive radar system to output one or more wireless signals having information encoded therein for receipt by the remote device and that are not used for detection and ranging of objects in a space around the automotive radar system; and b) a combined mode, wherein the communication element is configured to provide signalling to the automotive radar system to cause the automotive radar system to output one or more wireless signals having the information encoded therein for the remote device and the automotive radar system is configured to use reflections of said one or more signals for detection and ranging of objects in a space around the automotive radar system.

In one or more embodiments, the apparatus is configured to provide for switching of the automotive radar system between the radar mode and the signalling mode so as to provide for time sharing between performing detection and ranging and transmitting information to the remote device based on one or more of: predetermined sharing criteria, usage requirements of the communication element and usage requirements of the automotive radar system.

In one or more embodiments, the apparatus is configured to provide for switching of the automotive radar system between the radar mode and the combined mode based on usage requirements of the communication element.

According to a third aspect of the present disclosure there is provided a method comprising one or more of: a) providing signalling to an automotive radar system to generate a wireless signal comprising information for transmission to a remote device remote from an automotive radar system; b) receiving signalling representative of information from the remote device via an automotive radar system.

In one or more examples, the signalling to the automotive radar system provides for transmission of one or more signals that contain information from a transceiver of the automotive radar system, wherein said one or more signals may or may not also be used for detection and ranging of objects in a space around the automotive radar system.

In one or more examples, the step of providing signalling to an automotive radar system to generate a signal comprising information further comprises the step of: encoding information on a wireless signal generated by the automotive radar system by modulating the wireless signal.

According to a fourth aspect of the present disclosure there is provided an automobile comprising a system of the second aspect.

According to a fifth aspect of the present disclosure there is provided a computer program product bearing computer program code which when executed by a processor having associated memory, provides for performance of the method of the third aspect.

According to a sixth aspect of the present disclosure there is provided an apparatus comprising a remote device configured to communicate with an automobile, the remote device remote from the automobile and configured to one or more of: a) provide information to a communication element of the automobile by wireless signalling to an automotive radar system; and b) receive information from a communication element of the automobile via wireless signalling sent from the automotive radar system of the automobile.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which.

Radar systems are becoming increasingly common in the automotive industry. These systems are used, for example, as sensors for assisted parking, automatic cruise control speed adjustment (adaptive cruise control), headway alert, collision warning and mitigation and brake support. We describe example embodiments that provide for an advantageous multi-use radar system which combines the functionalities mentioned above with a wireless signalling system for communication with a remote device.

Radar (originally an acronym, RADAR) stands for RAdio Detection And Ranging. While radar technology was originally directed towards the use of radio frequency electromagnetic waves for detection and ranging, this term is now often used generically for electromagnetic waves of any frequency that are used for detection and ranging purposes.

A radar system performs detection and ranging by emitting an electromagnetic wave, such as a pulse, from a transmission antenna and measuring the time taken for the reflected wave to be detected at a receiving sensor. The amount of time taken for a reflected wave to reach an obstacle and be reflected back provides an indication of the distance of that obstacle from the radar system. By using a series of pulses or a continuous wave mode of operation (such as in a continuous wave radar), a time-resolved distance profile of a space around a radar system may be obtained. The phrase "detection and ranging" may be used herein to define the function of a wireless signal used for providing automotive radar functionality, even if said wireless signal is only used for detection or for both detection or ranging by the automotive radar system.

Figure 1:
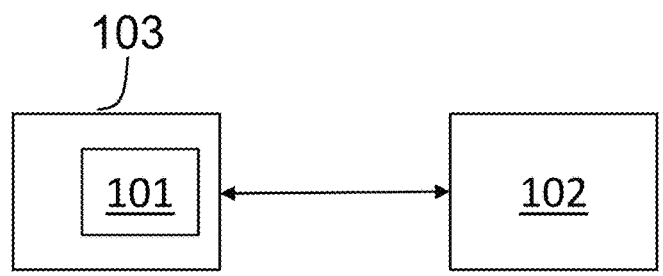
FIG. 1 shows an example embodiment of an apparatus.

FIG. 1 shows an apparatus 100 comprising a communication element 101 for an automotive radar system 103, the communication element 101 configured to communicate with a remote device 102 remote from the automotive radar system 103 by one or more of: a) providing signalling to the automotive radar system 103 to send information to the remote device 102; b) receiving signalling representative of information from the remote device 102 via the automotive radar system 103.

Thus, the apparatus 100 may provide for sending of information for interpretation by and/or acting on by the remote device via the automotive radar system 103. The apparatus 100 may receive information that was generated by the remote device and received via the automotive radar system 103.

The apparatus 100 may comprise at least one of (i) at least part of the automotive radar system 103, as in the example of FIG. 1; (ii) an apparatus in communication with the automotive radar system 103 for control thereof and/or receipt of information therefrom; (iii) at least part of a user-interface-providing-device for an automobile; and (iv) software or firmware for the automotive radar system 103 for execution by a processor thereof. The apparatus 100 may be pre-installed in an automobile or it may be a device which can be retro-fitted therein. The apparatus 100 comprising the communication element 101 may provide communication functionality for one or more automotive based devices that may communicate with the remote device 102 using wireless signalling sent and/or received by the automotive radar system 103.

The communication element 101 may be configured to provide for communication to and/or from one or more remote devices 102. The communication element 101 may be configured to provide communication functionality for one or more devices associated with the automobile. The devices may be part of an automobile or may be external thereto.

The devices for which the communication element 101 provides communication functionality may act based on user input or automatically, such as based on a distance measuring device; or a timer system for triggering use of the communication element 101. The communication element 101 may be configured to receive signals from a user, such as an "open garage door" instruction or an "override traffic signals" instruction. Instructions received from a user by the apparatus 100 may be processed by the communication element 101 to provide for the sending of wireless signalling representative of one or more instructions to one or more remote devices 102 via the automotive radar system 103. For example, an "open garage door" instruction may cause the communication element 101 to send a signal to the automotive radar system 103, causing the automotive radar system 103 to send information to a remote device comprising a garage door 102, which will cause the door to open automatically. The "open garage door" instruction may be triggered manually by a driver of an automobile or it may be triggered automatically by a satellite navigation system sending instructions to the communications element 101 when its associated automobile comes within a predefined distance of the automobile's garage. Alternatively, an instruction received from a user may cause a timer to schedule a signal to be sent by the communication element 101 at a predetermined later time via the automotive radar system 103. For example, a user may schedule automobile software updates to take place at a predetermined time each evening. At the predetermined time, the communication element 101 may instruct the automotive radar system 103 to send an update triggering pulse to a remote device 102 which is connected, for example, to a household internet connection. Upon receiving the update triggering pulse, the remote device 102 may check for software updates for the apparatus 100 or other systems in the automobile and, if available, send said updates back to the communication element 101 via the automotive radar system 103.

The user instructions may be provided via an interface of the automobile, by an application of a mobile electronic device or by receipt of a voice command by any suitable device which is in communicative connection with the communication element.

The present disclosure is not limited to any particular remote devices 102 with which the apparatus 100 and the automotive radar system 103 may communicate. Based on the present disclosure, the skilled person may immediately imagine a range of devices which are remote from an automobile in which the automotive radar system 103 is installed. For example, the remote device 102 may be a controller for a garage door, such that a wireless signal received by the controller via the automotive radar system 103 would cause a garage door to open. The garage door controller may provide a wireless signal to the apparatus 100 via the automotive radar system 103 that the garage door is open or closed. As a further example, the remote device 102 may be a controller for a traffic management system such that, on approach by an emergency vehicle with an apparatus 100 and automotive radar system 103 of the present disclosure installed therein, a wireless signal may be received by the traffic management system from the apparatus 100 via the automotive radar system 103 that causes traffic lights to change colour such that the emergency vehicle can pass through a regulated traffic area safely. As another example, the remote device 102 may be the automotive radar system 103 of a remote automobile and information encoded in a wireless signal from the automotive radar system of the remote automobile may comprise information pertaining to the actions which said remote automobile are going to take, such as changing lanes, turning, breaking, etc. Such a remote automobile may be, for example, a self-driving car. The information received from a remote device 102 may therefore comprise a range of different types of information. For example, the information may be directed towards: an instruction confirmation signal, in response to a signal from the communication element 101 via the automotive radar system 103; an identification signal; an indication of an action to be taken by another automobile; traffic update information from a traffic update beacon; a software update; or another type of information. The person skilled in the art may envision a range of further possible uses for information which can be received by the communication element 101 via the automotive radar system 103.

The provision of signalling by the communication element 101 may comprise sending one or more signals to cause the automotive radar system 103 to emit an electromagnetic wave comprising, for example, a pulse signal or continuous signal, which comprises information for receipt by the remote device 102. The signalling may provide for one or more of (i) sending of information by the automotive radar system 103 in time periods where it is not providing for detection and ranging functionality and (ii) the encoding of information in a detection and ranging wireless signal emitted by the automotive radar system 103. This may be advantageous, as the communication element 101 may time share the wireless signal sending capability of the automotive radar system 103 and/or may provide for encoding of information in a wireless signal that is also used for detection and ranging of objects in a space around the automotive radar system 103. Thus, reflections of the wireless signal in which information is encoded may be used for detection and ranging purposes, in the manner of a radar system. Alternatively, the detection and ranging functionality may not be in use when the wireless signal comprising information for the remote device 102 is transmitted. A wireless signal in which information is encoded may still be emitted whether or not a remote device 102 is within range.

The signalling received by the communication element 101, that is representative of information from the remote device 102 received via the automotive radar system 103, may be processed or unprocessed by the automotive radar system 103. The communication element 101 may be configured to receive some or all of the wireless signals received by the automotive radar system 103. The communication element 101 may be configured to analyse the signalling from the automotive radar system 103 to identify whether or not information from the remote device 102 is present. In one or more examples the automotive radar system 103 may determine whether or not information from a remote device 102 is present in the wireless signals it receives and forwards signalling to the communication element 101 based on its presence.

The information from the remote device 102 received in the signalling from the automotive radar system 103 may be routed, by the communication element 101, to one or more of a plurality of different devices associated with the automobile for a variety of purposes. Accordingly the communication element 101 may be configured to route the signalling to one or more of a plurality of devices based on information within the signalling or with reference to predetermined routing information. The devices may comprise devices on board an automobile with which the automotive radar system 103 is part. For example the received information: may be routed to a dashboard display device configured to result in a dashboard indicator being displayed for the user; may be routed to a mobile device for updating an app or providing a notification to a user; may be routed to update a satellite navigation system; or may be routed to update software and/or firmware of the apparatus 100 or another device. For example, based on the garage door opener example or the traffic light example, the information may comprise confirmation that the required action has been taken.

Figure 2:
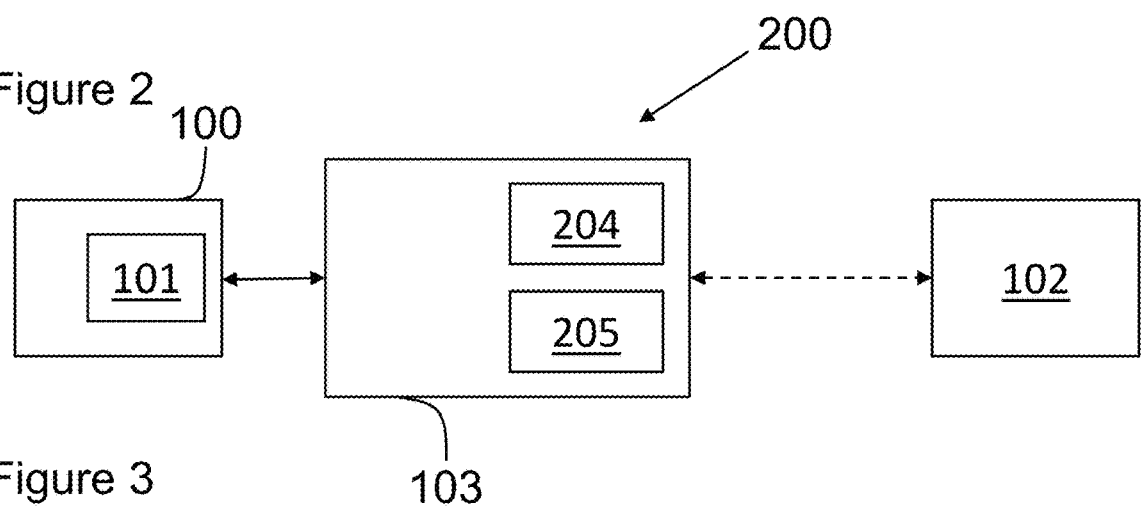
FIG. 2 shows an example embodiment of a system.

FIG. 2 shows a system 200 comprising the apparatus 100 and its communication element 101, discussed above, configured to interface with an automotive radar system 103, the automotive radar system 103 comprising a transmitting antenna 204 and a receiving antenna 205. The transmitting antenna 204 and the receiving antenna 205 may be the same antenna used for both purposes. In this case, a transceiver may be configured to use the antenna (204, 205) by way of time sharing or may be operated in another suitable mode in order to allow transmission and receipt of wireless signals. In this example, the communication element 101 is separate from the automotive radar system 103 and may be configured to communication with the automotive radar system 103. Accordingly, the apparatus 100 of FIG. 2 may be for installation in an automobile or may be retro-fitted to an automotive radar system 103 already installed in an automobile.

Providing signalling to the automotive radar system 103 to send information to a remote device 102 may require information to be encoded in the output of the automotive radar system 103. Information may be encoded in the output of the automotive radar system 103 using one or more of a plurality of signal modulation techniques. In one or more examples, the communication element 101 may be configured to provide signalling to control the automotive radar system 103 such that wireless signals generated by the radar system comprise the information whether or not those wireless signals are also used for radar detection and ranging. In one or more examples, after the generation of the wireless signal by the automotive radar system 103, the signalling from the communication element 101 may provide for modulation of the wireless signal in order to encode information therein. The system 200 may include one or more modulation devices for modulating the output of the automotive radar system 103.

Figure 3:
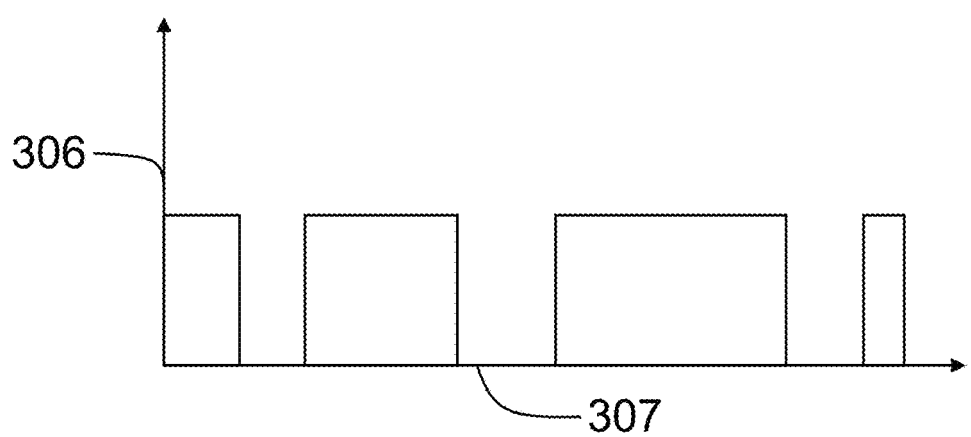
FIG. 3 shows an example embodiment of a modulated signal.
Figure 4:
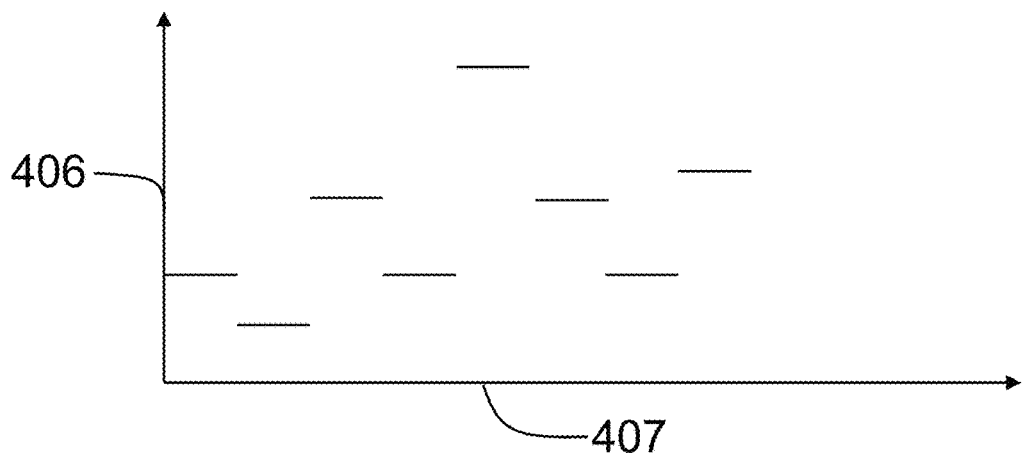
FIG. 4 shows a further example embodiment of a modulated signal.

FIGS. 3 and 4 show different methods for encoding information in an electromagnetic signal. The x-axis (307, 407) of each of these figures represents time, while the y-axis (306, 406) represents signal amplitude. For example, FIG. 3 shows an example of on-off keying modulation and FIG. 4 shows an example of amplitude modulation. Any suitable modulation technique may be used to encode information into the wireless signal output by the automotive radar system 103. In some examples, analogue modulation techniques may be used to modulate the wireless signal output by the automotive radar system, such as: amplitude modulation; frequency modulation; phase modulation; quadrature amplitude modulation; space modulation; or single-sideband modulation. In other examples, digital modulation techniques may be used, such as: amplitude-shift keying; amplitude and phase-shift keying; continuous phase modulation; frequency-shift keying; multiple frequency-shift keying; minimum-shift keying; on-off keying; pulse-position modulation; phase-shift keying; quadrature amplitude modulation; single-carrier FDMA (frequency-division multiple access); or trellis modulation. In yet further examples, spread spectrum modulation may be used, such as: chirp spread spectrum modulation; direct-sequence spread spectrum modulation; frequency-hopping spread spectrum; or time hopping modulation. Alternatively, any other modulation technique suitable for encoding information in a wireless signal may be used. In one or more examples, the communication element 101 may be configured to provide for encoding of information in the wireless signal emitted by the automotive radar system 103 by one or more of: any analogue modulation, digital modulation or spread spectrum modulation technique.

After receipt of signalling representative of information from the remote device 102 via the automotive radar system 103, the received signalling may be decoded in order to extract the information encoded therein. Decoding the information from the signalling representative of information may be performed using any appropriate demodulation techniques based on how the information is encoded.

The automotive radar system 103 may be configured to output wireless signals in the form of electromagnetic waves. The frequency of the output electromagnetic waves may be in the microwave frequency range. For example, the frequencies may be between 1-300 GHz. In particular, the frequencies may be between 20-200 GHz or between 30-100 GHz. As a specific example, the frequency of the microwaves may be approximately 77 GHz. In some example embodiments, these frequency ranges may be particularly advantageous for an automotive radar system 103 which allows for information to be encoded therein because these frequencies may lie within regulated frequency bands for automotive radar systems. Alternatively, other frequencies may be used where allowable by relevant national regulations. Accordingly the wireless signals output by the automotive radar system 103 may comprise carrier waves for information intended for the remote device 102.

The automotive radar system 103 may operate in a plurality of modes. In a first mode, comprising a radar mode, the automotive radar system 103 may be configured to generate one or more wireless signals for detection and ranging. In the radar mode, the automotive radar system 103 may further receive reflected wireless signals so as to provide the detection and ranging functionality of a normal radar system without encoding information for a remote device 102 in the wireless signal. In a second mode, comprising a signalling mode, the automotive radar system 103 may be configured to output information encoded in a wireless signal which may not be used for detection and ranging purposes. In the signalling mode, the output may be provided in the same frequency range as wireless signals used for detection and/or ranging by the radar functionality or it may be provided at a different frequency. In a third mode, comprising a combined mode, the wireless signal output by the automotive radar system 103 is used for detection and ranging purposes and also comprises information encoded therein for receipt by a remote device 102. Thus, the apparatus 100 may be configured to operate using the first and second modes and thereby share the wireless signal output capability of the radar system between ranging and detection purposes and wireless signalling purposes or by using the first and third modes to provide for encoding of information for the remote device 102 without disruption (due to sharing) of detection and ranging functionality.

Figure 5:
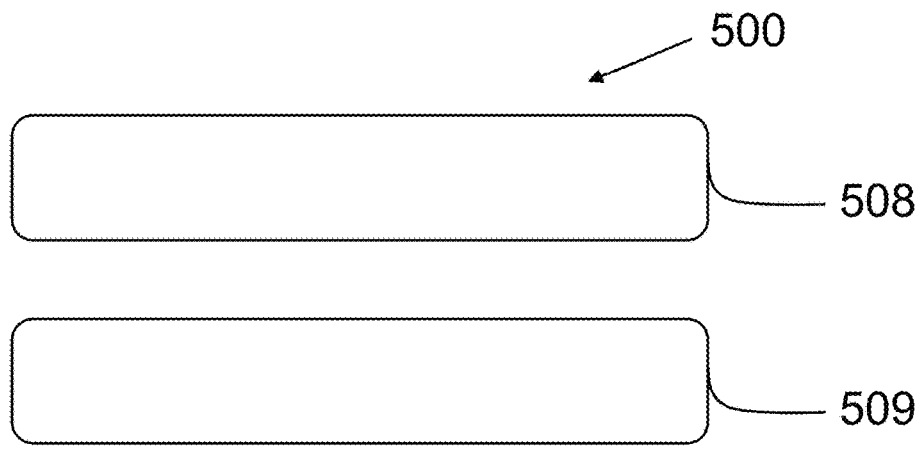
FIG. 5 shows an example embodiment of a method.

FIG. 5 shows a flow chart representing the steps of a method 500 of the present disclosure. The method 500 may comprise one or more of: providing signalling 508 to an automotive radar system 103 to generate a wireless signal comprising information for transmission to a remote device 102; and receiving signalling 509 representative of information from the remote device 102 via an automotive radar system 103. The method of providing signalling 508 to an automotive radar system 103 to generate a wireless signal comprising information may further comprise the step of encoding information in a wireless signal generated by the automotive radar system 103 by modulating the wireless signal. The modulation may be performed at the time of generation of the wireless signal, or it may be performed using post-generation methods. Methods of modulating the wireless signal may comprise one or more of any suitable analogue, digital or spread spectrum modulation technique.

The method may also comprise the step of decoding information of a wireless signal received from the remote device 102 via the automotive radar system 103. The decoding techniques may be any suitable demodulation technique for decoding the received signal.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

Figure 6:
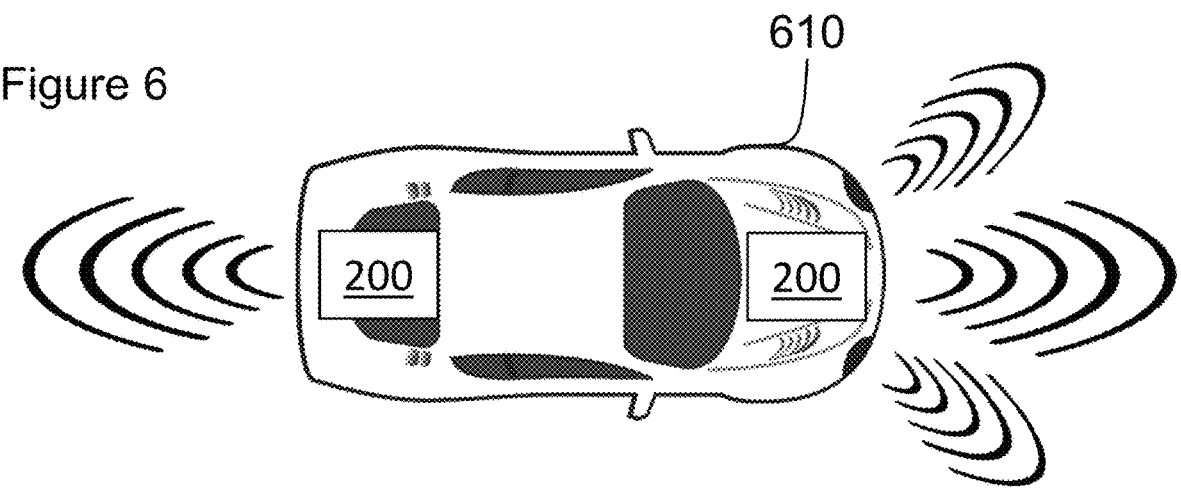
FIG. 6 shows an example embodiment of an automobile.
Figure 7:
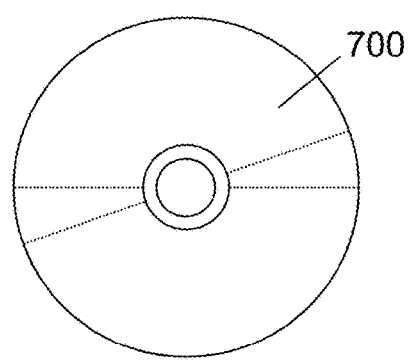
FIG. 7 shows an example embodiment of a computer program product.

FIG. 6 shows an automobile 610 that may comprise the system 200 described above. The automobile may comprise a car, a self-driving car, a truck, a lorry, a van, a caravan, a motorbike, a utility vehicle, a boat, a ship, a drone, an aircraft or an emergency services vehicle.

In another aspect of the present disclosure, there is a computer program configured to perform the method described above. In an example the computer program is provided by a computer program product 700 comprising a computer readable medium bearing computer program code for execution by a processor associated memory, the computer program code comprising code for performing the method 500 described above. The computer program may be executed by a processor of an automotive radar system 103 or a processor in communication with the automotive radar system 103.

FIGS. 1 and 2 also show the remote device 102 which may be configured to communicate with an automobile via an automotive radar system 103 of the automobile. In particular, the remote device 102 may be configured to send wireless signalling that utilises the transceiver of an automotive radar system 103 to communicate with one or more devices of the automobile. The remote device 102 may comprise a controller for a garage door, such that a wireless signal received from the communication element 101 via an automotive radar system 103 would cause a garage door to open. In one or more examples, the remote device 102 may be a controller for a traffic management system such that, on approach by an emergency vehicle with an apparatus 100 and automotive radar system 103 of the present disclosure installed therein, a wireless signal may be received at the remote device 102 that causes traffic lights to change colour such that the emergency vehicle can pass through a regulated traffic area safely. In one or more examples, the remote device 102 may be the automotive radar system 103 of a remote automobile and the transmitted wireless signal may comprise information pertaining to the actions which said remote automobile is going to take, such as changing lanes, turning, breaking, etc. Such a remote automobile may be, for example, a self-driving car. The remote device may be configured to send and/or receive wireless signalling in a frequency range corresponding to the operating frequency range of the automotive radar system 103.

In addition, we disclose a computer program product for a remote device 102 that comprises a computer-readable medium bearing computer program code for execution by a processor of the remote device 102 having associated memory, the computer program code comprising code to configure the remote device 102 to one or more of: provide for communication with an automobile by way of wireless signalling to an automotive radar system 103 of the automobile; receive signalling representative of information from an automobile by way of one or more wireless signals from the automotive radar system 103 of the automobile.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. An apparatus comprising a communication element for an automotive radar system, the communication element configured to communicate with a remote device, the communication element is configured for:
   a) providing signalling to the automotive radar system to send information to the remote device;
   b) receiving signalling representative of information from the remote device via the automotive radar system,
   wherein the remote device is configured to receive the information and perform an operation based on instructions in the information that is sent to the remote device, wherein based on contents of the information in the received signal, the communication element is further configured to route the information in the received signal to one or more devices for a processing of the received information.

2. The apparatus of claim 1, wherein the communication element is configured to provide signalling to the automotive radar system based one or more of:
   a) a received user generated control signal;
   b) a distance between the automotive radar system and the remote device; and
   c) a time reaching a predetermined time.

3. The apparatus of claim 1, wherein the communication element provides for routing of information received from the remote device to one or more of a plurality of devices.

4. The apparatus of claim 1, wherein the apparatus comprises one or more of a controller for a wirelessly triggered garage door opener; a traffic signal prioritization controller for wirelessly controlling the operation of traffic lights; and a vehicle to vehicle communication unit for sending information to the remote device comprising a vehicle.

5. A system comprising the apparatus of claim 1, and an automotive radar system, the automotive radar system comprising a transmitting antenna and a receiving antenna wherein the transmitting antenna is configured to transmit information to the remote device based on the signalling from the communication element and wherein the receiving antenna is configured to receive wireless signalling representative of information from the remote device for receipt by the communication element.

6. The system of claim 5, wherein the transmitting antenna and the receiving antenna are the same antenna.

7. The system of claim 5, wherein system includes an encoder and providing signalling to the automotive radar system comprises providing signalling to the encoder configured to encode information into a wireless signal for transmission from the automotive radar system to the remote device via the transmitting antenna.

8. The system of claim 5, wherein the system further comprises a decoder configured to decode information from signalling representative of information received from the remote device by the automotive radar system.

9. The system of claim 7, wherein the encoder is configured to encode information by one or more of: an analogue modulation technique; a digital modulation technique; or a spread spectrum modulation technique.

10. The system of claim 5, wherein the communication element and the automotive radar system are configured to provide for operation in a radar mode, wherein a radar signal for detection and ranging is output by the automotive radar system which does not comprise information for receipt by the remote device and one or more of:
  a) a signalling mode, wherein the communication element is configured to provide signalling to the automotive radar system to cause the automotive radar system to output one or more wireless signals having information encoded therein for receipt by the remote device and that are not used for detection and ranging of objects in a space around the automotive radar system; and
  b) a combined mode, wherein the communication element is configured to provide signalling to the automotive radar system to cause the automotive radar system to output one or more wireless signals having the information encoded therein for the remote device and the automotive radar system is configured to use reflections of said one or more signals for detection and ranging of objects in a space around the automotive radar system.

11. A method comprising one or more of:
  a) providing signalling to an automotive radar system to generate a wireless signal comprising information for transmission to a remote device remote from an automotive radar system;
  b) receiving signalling representative of information from the remote device via an automotive radar system
  wherein the remote device is configured to receive the information and perform an operation based on instructions in the information that is sent to the remote device, wherein based on contents of the information in the received signal, a communication element is further configured to route the information in the received signal to one or more devices for a processing of the received information.

12. The method of claim 11, wherein the step of providing signalling to an automotive radar system to generate a signal comprising information further comprises the step of:
  encoding information on a wireless signal generated by the automotive radar system by modulating the wireless signal.

13. An automobile comprising a system of claim 5.

14. A computer program product bearing computer program code which when executed by a processor having associated memory, provides for performance of the method of claim 11.

15. An apparatus comprising a remote device configured to communicate with an automobile, the remote device remote from the automobile and configured to one or more of:
  a) provide information to a communication element of the automobile by wireless signalling to an automotive radar system; and
  b) receive information from a communication element of the automobile via wireless signalling sent from the automotive radar system of the automobile, wherein the remote device is configured to receive the information and perform an operation based on instructions in the received information, wherein based on contents of the information in the received signal, the communication element is configured to route the information in the received signal to one or more devices for a processing of the received information.

* * * * *